May 14, 1946. A. C. RUGE 2,400,467
FLUID PRESSURE RESPONSIVE DEVICE
Filed Nov. 5, 1943

INVENTOR
Arthur C. Ruge
BY
ATTORNEY

Patented May 14, 1946

2,400,467

UNITED STATES PATENT OFFICE 2,400,467

FLUID PRESSURE RESPONSIVE DEVICE

Arthur C. Ruge, Cambridge, Mass., assignor to The Baldwin Locomotive Works, a corporation of Pennsylvania Application November 5, 1943, Serial No. 509,127

5 Claims. (Cl. 201—63)

This invention relates generally to pressure responsive devices and more particularly to a diaphragm type of pressure device employing electrical strain measuring means responsive to strain of the diaphragm as an indication of the pressure acting thereon.

A great many pressure responsive arrangements, particularly of the diaphragm type, have been heretofore suggested and used but the same have been deficient in various functional and structural aspects. For instance, such devices have been either relatively low in sensitivity, accuracy or stability, or on the other hand they were too cumbersome or expensive in initial cost and maintenance, particularly where a high degree of accuracy and sensitivity was desired.

It is one object of my invention to provide an improved pressure responsive apparatus that is relatively simple and economical in construction, operation and maintenance and is compact, sturdy and stable, as well as having a high degree of sensitivity, accuracy and responsiveness.

In accomplishing the foregoing, as well as other objects, I provide a diaphragm with strain gages mounted thereon in an improved manner so as to obtain increased sensitivity. To this end I utilize the principle that a diaphragm which is wholly or partially restrained at its rim is subject on a given side simultaneously to tension near its central portion and compression near its rim when pressure acts on the other side. I mount the gages in these areas, the specific type of electrical strain sensitive means disclosed hereing being of the same type disclosed in Simmons Patent No. 2,292,549 wherein a continuous filament of wire bonded throughout its effective length to a member subject to strain has its electrical resistance vary in accordance with its strain. A suitable electrical measuring circuit measures or responds to the change in resistance which is an index of the change in pressure acting against the diaphragm.

Other objects and advantages will be more apparent to those skilled in the art from the following description of the accompanying drawing in which.

Figure 1:
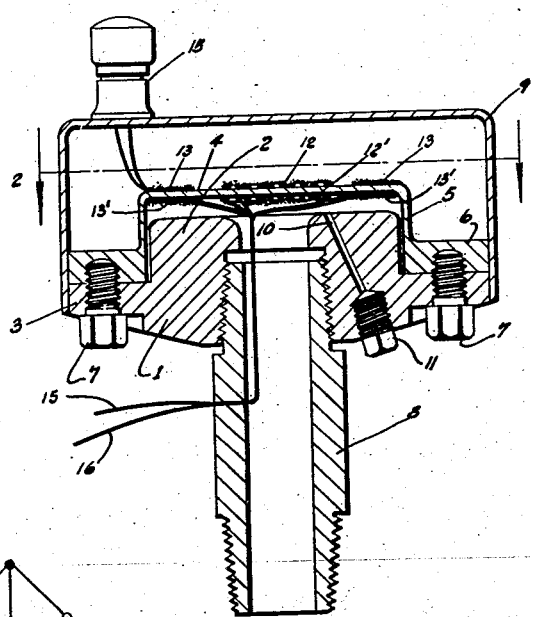
Fig. 1 is a vertical sectional view of my improved pressure responsive device.

In the particular embodiment of the invention disclosed herein for purposes of illustration, I have shown my pressure device as having a base 1 with a relatively heavy central filler section 2 and a radial flange 3. A diaphragm 4 of preferably circular form has preferably but not necessarily a down turned rim 5 and a relatively heavy radial flange 6 adapted to be firmly held to base flange 3 by studs 7. The diaphragm can run straight across flange 6, if desired, it being understood, in general, that the turned down rim would be omitted where pressure is great enough to provide high strains on a flat diaphragm. In other words, the downturned rim arrangement adds to the sensitivity of the pressure response particularly for low pressures. A suitable pipe connection 8 may be threaded to the base 1 for communication with the relatively narrow space between the diaphragm 4 and the top of the filler 2. The pipe 8 is to be adapted to be connected to any suitable source of pressure to be measured. A protective cover 9 of preferably cylindrical form is snugly fitted to the periphery of flanges 3 and 6 and if necessary hermetically sealed thereto by welding or other suitable means. To bleed the diaphragm chamber of air or other undesirable gases prior to filling the chamber with liquid, in case liquid pressure is to be measured, I provide a vent passage 10 covered by a normally closed but a removable plug 11. The pressure device may be used for differential pressure measurements merely by supplying fluid pressure from one source to the inside of cover 9 to act on top of the diaphragm while pressure from another source connected to pipe 8 acts on the underside of the diaphragm.

When the diaphragm is subjected on its underside to pressure it will bulge upwardly at its central portion which will place the central portion of the upper surface in tension whereas the portion of the diaphragm near its rim will curve upwardly in a slightly concave manner thus placing this portion of the diaphragm under compression at its upper surface. Hence, a reverse curvature, concave and convex, occurs on the same side of the diaphragm. On one side the convex curvature is at the center and the concave curvature near the perimeter and vice versa for the other side. I take advantage of this structure and mode of operation by placing a filament of wire 12 across the central portion of the diaphragm and in accordance with the disclosure of said Simmons patent, this wire is bonded throughout its effective length to the diaphragm surface by suitable cement such as "Duco" household cement, "Glyptal," etc. A similar strain sensitive filament 13 is bonded to the diaphragm near its rim, preferably around the entire circumference of the same, except that this wire may be wound back and forth radially so as to be responsive to compression strains at all points around the diaphragm rim. Thus both gages are mounted on the same side but are subjected to oppositely acting stresses.

Figure 3:
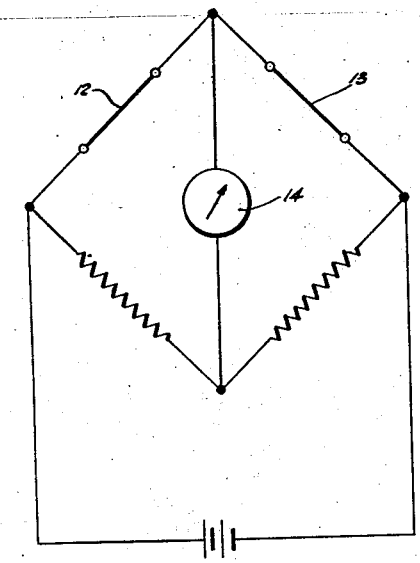
Fig. 3 is a diagrammatic outline of a measuring circuit.
Figure 2:
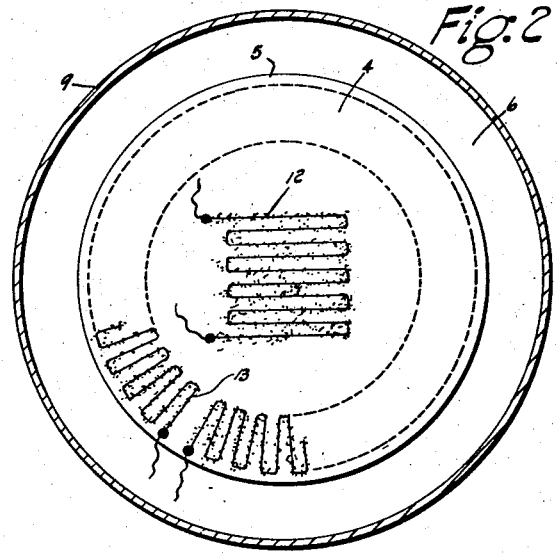
Fig. 2 is a sectional plan view taken substantially on the line 2—2 of Fig. 1.

These two filaments 12 and 13 both of which constitute strain gages, are connected through suitable terminals, such as 15, to form two arms of a Wheatstone bridge shown in Fig. 3 so that their combined tension and compression strains are cumulative in their action on the bridge, thereby increasing the sensitivity considerably beyond what would be obtained with only a single strain gage on the diaphragm regardless of whether the gage is used for high pressure or a vacuum. A galvanometer 14 or other suitable detector may be employed for static measurements or an oscillograph may be used for dynamic measurements or the circuit may be provided with controlling means to regulate the pressure in a desired manner. Another advantage of the two gage arrangement is that they compensate for temperature changes when connected in a Wheatstone bridge, as shown, while at the same time obtaining the increased sensitivity mentioned above. Greater sensitivity is possible by dividing each gage into two equal parts and using them in all four arms of the bridge. Or, if desired, the gages 12 and 13 may be duplicated on the underside of the diaphragm as shown at 12' and 13', in which case central gage 12' is under compression and gage 13' is in tension when the diaphragm is subjected to pressure on the underside. The four gages are then placed in the four arms of the bridge to give an accumulative result. Such an arrangement would be useful for measuring gas pressures, although in measuring liquid pressures the gages and lead connections 15 and 16 could be covered by suitably insulating cement and/or material to prevent short circuiting.

From the foregoing disclosure it will be seen that I have provided an extremely simple, compact, highly reliable and sensitive pressure gage that can be made relatively economical considering the degree of accuracy and sensitivity obtained in this device.

It will of course be understood that various changes in details of construction and arrangement of parts may be made by those skilled in the art without departing from the spirit of the invention as set forth in the appended claims.

I claim:

1. A pressure responsive device comprising a diaphragm, means to which the diaphragm is secured so that the diaphragm may partially flex with reverse curvature on the same side so that such side is subject to both compression and tension in response to pressure applied to one side thereof, and means secured to the diaphragm so as to be responsive to both the tension and compression strains directly in the diaphragm material during flexure thereof.

2. A pressure responsive device comprising a diaphragm, means to which the diaphragm is secured so that the diaphragm may partially flex with reverse curvature on the same side so that such side is subject to both compression and tension in response to pressure applied to one side thereof, means responsive to the tension strains directly in the material of said diaphragm, and means also responsive to the compression strains directly therein occurring on the same side of the diaphragm simultaneously with the tension strains on such side.

3. A pressure responsive device comprising a diaphragm, means to which the diaphragm is secured so that the diaphragm may partially flex with reverse curvature on the same side so that such side is subject to both compression and tension in response to pressure applied to one side thereof, electrical conducting material whose electrical resistance varies with strain bonded throughout its effective length to the central portion of said diaphragm so as to be subect to the tension strains therein, and electrical conducting material whose electrical resistance varies with strain bonded throughout its effective length radially of the diaphragm near its outer portion on the same side containing the tension strains so as to subject to the compression strains in the diaphragm simultaneouly during occurrence of tension strains in the central portion thereof.

4. A responsive device comprising a base, a diaphragm having a flexible diaphragm portion and an integral angularly turned rim whose thickness is similar to that of the diaphragm so as to add to the sensitivity of the pressure response of the diaphragm, said rim terminating in a relatively heavy flange, means for securing said diaphragm flange to said base, and means for supplying pressure fluid to act on said diaphragm.

5. A pressure responsive device comprising a base, a diaphragm having a flexible diaphragm portion, an angularly turned rim integrally connected to said diaphragm and whose thickness is substantially equal to that of the diaphragm, said rim terminating in a relatively heavy flange, means for securing said flange to said base, and a filler portion on said base projecting upwardly toward the diaphragm to provide a relatively narrow space beneath the latter.

ARTHUR C. RUGE.

Certificate of Correction

May 14, 1946.

Patent No. 2,400,467.

ARTHUR C. RUGE

It is hereby certified that error appears in the printed specification of the above numbered patent requiring correction as follows: Page 2, second column, line 34, claim 3, before "subject" insert *be*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*